United States Patent
Bender et al.

(10) Patent No.: US 9,294,470 B2
(45) Date of Patent: *Mar. 22, 2016

(54) CERTIFICATE MANAGEMENT METHOD BASED ON CONNECTIVITY AND POLICY

(71) Applicant: BlackBerry Limited, Waterloo (CA)

(72) Inventors: Christopher Lyle Bender, Kitchener (CA); John Vincent Storozuk, Wellesley (CA); Alan Pak-Lun Ho, Unionville (CA); Chi Chiu Tse, Markham (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,286

(22) Filed: Nov. 18, 2014

(65) Prior Publication Data

US 2015/0074754 A1 Mar. 12, 2015

Related U.S. Application Data

(63) Continuation of application No. 13/727,788, filed on Dec. 27, 2012, now Pat. No. 8,893,219.

(60) Provisional application No. 61/600,299, filed on Feb. 17, 2012.

(51) Int. Cl.
*G06F 17/00* (2006.01)
*H04L 29/00* (2006.01)
(Continued)

(52) U.S. Cl.
CPC ............ *H04L 63/0823* (2013.01); *H04L 63/20* (2013.01); *H04L 67/34* (2013.01); *H04W 12/06* (2013.01); *H04W 4/001* (2013.01)

(58) Field of Classification Search
CPC ........ H04L 63/20; H04L 67/34; H04W 4/001
See application file for complete search history.

(56) References Cited

U.S. PATENT DOCUMENTS

| 4,945,556 A | 7/1990 | Namekawa |
| 5,864,765 A | 1/1999 | Barvesten |

(Continued)

FOREIGN PATENT DOCUMENTS

| CN | 101523878 A | 9/2009 |
| EP | 0973350 A1 | 1/2000 |

(Continued)

OTHER PUBLICATIONS

USPTO, Non Final Rejection dated Jan. 17, 2014 in respect of U.S. Appl. No. 13/727,788.

(Continued)

*Primary Examiner* — Fatoumata Traore
*Assistant Examiner* — Kendall Dolly
(74) *Attorney, Agent, or Firm* — Ridout & Maybee LLP (57) ABSTRACT

Plural modes of operation may be established on a mobile device. Specific modes of operation of the mobile device may be associated with specific spaces in memory. By associating the existing certificate store structure and key store structure with a mode of operation, certificates and keys can be assigned to one space among plural spaces. Furthermore, management (viewing/importation/deletion) of certificates associated with specific modes of operation may be controlled based on the presence or absence of a mobile device administration server and the status (enabled/disabled) of an IT policy.

20 Claims, 5 Drawing Sheets (51) Int. Cl.
  *H04L 29/06* (2006.01)
  *H04W 12/06* (2009.01)
  *H04L 29/08* (2006.01)
  *H04W 4/00* (2009.01)

(56) References Cited

U.S. PATENT DOCUMENTS

| | | | |
|---|---|---|---|
| 5,987,440 | A | 11/1999 | O'Neil et al. |
| 5,987,611 | A | 11/1999 | Freund |
| 6,052,735 | A | 4/2000 | Ulrich et al. |
| 6,105,132 | A | 8/2000 | Fritch et al. |
| 6,233,446 | B1 | 5/2001 | Do |
| 6,292,798 | B1 | 9/2001 | Dockter et al. |
| 6,351,816 | B1 | 2/2002 | Mueller et al. |
| 6,360,322 | B1 | 3/2002 | Grawrock |
| 6,405,202 | B1 | 6/2002 | Britton et al. |
| 6,412,070 | B1 | 6/2002 | Van Dyke et al. |
| 6,516,421 | B1 | 2/2003 | Peters |
| 6,647,388 | B2 | 11/2003 | Numao et al. |
| 6,668,323 | B1 | 12/2003 | Challener et al. |
| 6,757,821 | B1 | 6/2004 | Akiyama et al. |
| 6,772,350 | B1 | 8/2004 | Belani et al. |
| 6,886,038 | B1 | 4/2005 | Tabbara et al. |
| 6,957,330 | B1 | 10/2005 | Hughes |
| 6,978,385 | B1 | 12/2005 | Cheston et al. |
| 7,246,374 | B1 | 7/2007 | Simon et al. |
| 7,331,058 | B1 | 2/2008 | Gladney |
| 7,400,878 | B2 | 7/2008 | Hassan et al. |
| 7,574,200 | B2 | 8/2009 | Hassan et al. |
| 7,869,789 | B2 | 1/2011 | Hassan et al. |
| 8,074,078 | B2 | 12/2011 | Brown et al. |
| 8,893,219 | B2 | 11/2014 | Bender et al. |
| 2001/0047485 | A1 | 11/2001 | Brown et al. |
| 2002/0019944 | A1 | 2/2002 | Kou |
| 2002/0031230 | A1 | 3/2002 | Sweet et al. |
| 2002/0095414 | A1 | 7/2002 | Barnett et al. |
| 2002/0095497 | A1 | 7/2002 | Satagopan et al. |
| 2002/0112155 | A1 | 8/2002 | Martherus et al. |
| 2003/0005317 | A1 | 1/2003 | Audebert et al. |
| 2003/0065676 | A1 | 4/2003 | Gbadegesin et al. |
| 2003/0093698 | A1 | 5/2003 | Challener et al. |
| 2003/0120948 | A1 | 6/2003 | Schmidt et al. |
| 2003/0126437 | A1 | 7/2003 | Wheller et al. |
| 2003/0163700 | A1 | 8/2003 | Paatero |
| 2003/0177389 | A1 | 9/2003 | Albert et al. |
| 2004/0001101 | A1 | 1/2004 | Trajkovic et al. |
| 2005/0154935 | A1 | 7/2005 | Jin |
| 2006/0059556 | A1 | 3/2006 | Royer |
| 2006/0070114 | A1 | 3/2006 | Wood et al. |
| 2006/0129948 | A1 | 6/2006 | Hamzy et al. |
| 2006/0156026 | A1 | 7/2006 | Utin |
| 2006/0212589 | A1 | 9/2006 | Hayer et al. |
| 2007/0005956 | A1* | 1/2007 | Zilinskas et al. ............... 713/156 |
| 2007/0073694 | A1 | 3/2007 | Picault et al. |
| 2007/0277127 | A1 | 11/2007 | Carlson et al. |
| 2008/0222711 | A1 | 9/2008 | Michaelis |
| 2010/0319053 | A1 | 12/2010 | Gharabally |
| 2011/0145833 | A1 | 6/2011 | De Los Reyes et al. |
| 2011/0314467 | A1 | 12/2011 | Pearson |
| 2012/0054853 | A1 | 3/2012 | Gupta et al. |
| 2012/0202527 | A1 | 8/2012 | Obradovich et al. |
| 2013/0054962 | A1 | 2/2013 | Chawla et al. |
| 2013/0061281 | A1* | 3/2013 | Pao et al. ......................... 726/1 |
| 2014/0007183 | A1 | 1/2014 | Qureshi et al. |

FOREIGN PATENT DOCUMENTS

| | | |
|---|---|---|
| WO | 0059225 | 10/2000 |
| WO | 2005045550 A2 | 5/2005 |

OTHER PUBLICATIONS

USPTO, Notice of Allowance and Fee(s) Due dated Jul. 18, 2014 in respect of U.S. Appl. No. 13/727,788.

* cited by examiner

FIG. 4

CERTIFICATE MANAGEMENT METHOD BASED ON CONNECTIVITY AND POLICY

CROSS-REFERENCE TO RELATED APPLICATIONS

The present application is a continuation of U.S. patent application Ser. No. 13/727,788, which was filed Dec. 27, 2012 and will issue as U.S. Pat. No. 8,893,219. U.S. patent application Ser. No. 13/727,788 claims priority to U.S. Provisional Patent Application Ser. No. 61/600,299, filed Feb. 17, 2012. The contents of both referenced applications are hereby incorporated herein by reference.

FIELD

The present application relates generally to management of digital identity certificates and, more specifically, to managing certificates in view of connectivity and policy.

BACKGROUND

Communication devices are used for a variety of purposes. Users may wish to use a particular communication device for personal applications such as games, reading news distributed using really simple syndication (RSS), web browsing and general leisure. Corporations may want the same communication device to be used for a subset of functionality required for a user to complete their job.

However, when a communication device is used for both corporate and personal matters, a corporation may choose to limit the risk of exposure of data on the communication device. This may be done, for example, through the implementation of information technology (IT) policies on the communication device. Such policies sometimes lead to a poor user experience, as the communication device may be locked such that no new applications may be loaded onto the communication device. Alternatively, the communication device may be restricted regarding which non-work-related applications may be loaded onto the device. For example, an IT policy on the communication device may, in a effort to prevent potential spread of viruses, prohibit the user of the communication device from downloading software from any location other than a specifically approved location. In this manner, the range of applications that the user can install may be significantly limited.

BRIEF DESCRIPTION OF THE DRAWINGS

Reference will now be made, by way of example, to the accompanying drawings which show example implementations; and in which.

DETAILED DESCRIPTION

Rather than restricting access to an entire communication device that is used for both personal and corporate functionality, the present disclosure contemplates the creation of dual or plural modes of operation on the communication device. In particular, each application of a plurality of applications may be segregated into one of a plurality of groups corresponding to the modes of operation. In an example scenario involving a corporate mode of operation and a personal mode of operation, applications can be designated as either corporate applications or personal applications. In some cases, where an application may be both corporate and personal, a copy of the application code can be saved in both a personal memory space and a corporate memory space on the communication device.

The present disclosure provides for communication devices, but is not meant to be limited to any particular device. Examples of communication devices include smart phones, personal digital assistants, data-enabled cellular telephones and tablet computers, among others.

The mobile communication device in the present disclosure may implement an IT policy to control corporate data. This may be done by connection to an enterprise server, which provides the IT policy for the device. In other embodiments, the IT policy may be implemented on a per device basis.

Notably, known methods of segregating applications may have far-reaching implications for management of security aspects of the mobile device. For example, it is known to save public and private cryptographic keys in memory in such a manner that the keys are associated with the mobile device and not with a mode of operation of the mobile device. Similarly, it is known to save digital identity certificates in memory in such a manner that the identity certificates are associated with a user of the mobile device and not with a mode of operation of the mobile device.

Furthermore, management (viewing/importation/deletion) of certificates associated with specific modes of operation may be controlled based on the presence or absence of a device administration server and the status (enabled/disabled) of an IT policy.

According to an aspect of the present disclosure, there is provided a method of regulating population of a certificate store in a memory of a device. The method includes determining that a device administration server is present and responsive to the determining, disabling user interface interaction for importing at least some certificates into a certificate store associated with a mode of operation of the device. In other aspects of the present application, a communication device with a processor is provided for carrying out this method and a computer readable medium is provided for adapting a processor in a communication device to carry out this method.

Other aspects and features of the present disclosure will become apparent to those of ordinary skill in the art upon review of the following description of specific implementations of the disclosure in conjunction with the accompanying figures.

Figure 1:
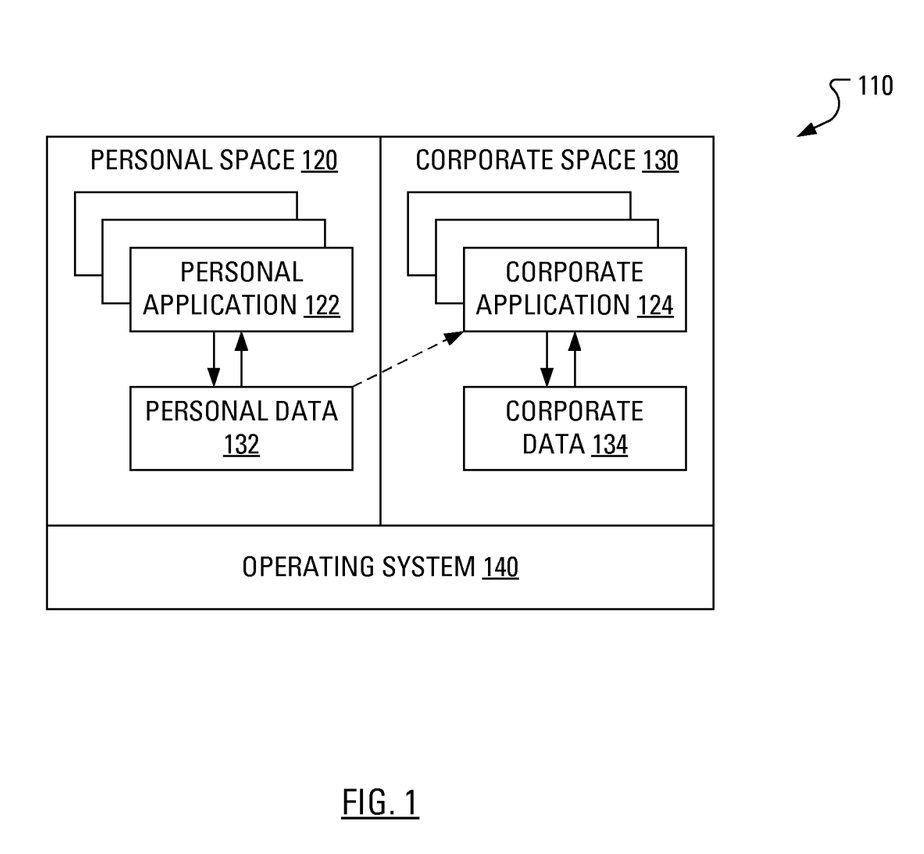
FIG. 1 illustrates a memory segregated into plural spaces.

Reference is now made to FIG. 1, which shows a block diagram of a memory 110 of a mobile device. The memory 110 is configured to maintain executable code for various applications and data related to the operation of the various applications, such combination of code and data being referred to herein as an "application space". As illustrated in the example of FIG. 1, the memory 110 is divided into a personal space 120 and a corporate space 130.

The corporate space 130 generally comprises a portion of memory on the mobile device segregated for data, applications, or both. The data and/or applications may be considered sensitive to a business, corporation, enterprise, government, non-profit organization, user of the device or any other entity responsible for the setting of an IT policy for the mobile device.

The personal space 120 generally comprises a portion of memory segregated for "personal" applications and data, where such applications or data may be considered outside of, or separate from, an IT policy.

An application 122 executed from code saved within the personal space 120 may access data 124 that is also saved within the personal space 120. The data 124 that is saved within the personal space 120 may be considered to be personal data.

Similarly, an application 132 executed from code saved within the corporate space 130 may access data 134 that is also saved within the corporate space 130. The data 134 that is saved within the corporate space 130 may be considered to be corporate data.

By segregating corporate applications from personal applications and data associated with each, a corporate IT policy may be implemented on the mobile device for the corporate data, thereby protecting the corporate data, while still allowing for personal applications and personal data on the device. This provides more flexibility and an arguably better user experience.

An operating system 140 enforces the segregation of the data as described in more detail below.

The designation of each application loaded onto the mobile device as either a personal application or a corporate application may be done in several ways. In one embodiment, a corporate IT policy can be set for the loading of applications onto the mobile device, where certain specified applications are designated by the IT policy to be on a list of corporate applications. Other applications, which are not the list of corporate applications, could be considered, by default, to be personal applications. In other embodiments, a user, administrator, carrier or other entity can use a configuration program or a navigation entity (application launcher) to designate the various applications on the device as either a personal application or a corporate application. Further, signatures applied to applications could also be used for making a distinction between personal applications and corporate applications. Other examples of the designation of applications as corporate and personal would be apparent to those skilled in the art having the benefit of the present disclosure.

In further embodiments, hybrid applications, which have both personal and corporate uses, could be duplicated between the corporate space 130 and the personal space 120. In this way, if a user wants to use a particular application for personal reasons, the user could execute the application code 122 that is saved in the personal space 120. Conversely, if the user wants to use the same application for corporate purposes, the user could execute the application code 132 that is saved in the corporate space 130.

Thus, for example, one copy of the code for a document editor could be saved in the personal space 120 and another copy of the code for the document editor could be saved in the corporate space 130, thereby allowing the editing of both personal documents and corporate documents, while maintaining security for the corporate data 134.

In one embodiment, the corporate applications 132 may be provided with additional security over the personal applications 122. For example, before allowing one of the corporate applications 132 to be launched, the operating system 140 may prompt the user to provide authentication, e.g., the operating system 140 may prompt the user to enter a password and the operating system 140 may authenticate the password. Further, inactivity timers could be implemented, such that the corporate applications 132 may be locked after a period of inactivity, while leaving the personal applications 122 unlocked. The operating system 140 may require a user to enter a password to unlock a locked corporate application 132 so that the corporate data 134 related to the corporate application 132 may be accessed.

The designation (e.g., "personal" or "corporate") of a given application may further limit the data to which the given application has access. Thus, for example, the corporate applications 132 may execute in their own mode in which mode any data that is written by the corporate applications 132 may not be accessed by the personal applications 122. The limitation would be that personal applications 122 are not able to read corporate data 134, nor is a corporate application capable of writing to personal data 124.

Similarly, a given personal application 122 may not be able to write to the corporate data 134. In some embodiments, the corporate applications 132 may not be able to read the personal data 124. In other embodiments, the corporate applications 132 may be able to read the personal data 124.

The corporate data 134 may be encrypted for security.

The corporate data 134 may also have date of deletion policies in effect on the mobile device. Thus, if a subset of the corporate data 134 is not accessed within a certain time period, a date of deletion policy may dictate that the subset is to be erased. The date of deletion policy may be pursuant to a corporate data reaping timeline. For example, if data is not accessed on the mobile or computing device for seven days, the data may be deleted from the mobile device. The user would then need to download the data again if the data was required for the mobile device. This may be implemented through tags or data tables associated with the data.

The operating system 140 may handle the enforcement of the above differentiating rules between the corporate space 130 and the personal space 120. For example, the operating system 140 may implement data access for the various applications 122 and 132, where each application is given a group permission. In other embodiments, other user permission or other permission system may also be used. Data is further designated in files that allow access by certain groups. Thus, the operating system 140 may allow the corporate data 134 to be accessed only by the corporate applications 132 that have group permissions to access such data. Similarly, the personal data 124 may be written to or read only by the personal applications 122 based on the group permissions of the personal applications 122 with regard to the personal data 124. The corporate applications 132, however, may not have group permissions to write to the personal data 124 in one embodiment, as enforced by the operating system 140.

As shown by a dashed line with an arrow tip in FIG. 1, the personal data 124 may have some form of public permissions that would allow the corporate applications 132 to read the personal data 124.

Access to the data may be maintained for other data functionalities, thereby preventing the corporate data 134 from being accessed in the personal mode. For example, copy or cut functionality may be managed between the personal mode and corporate mode. Potentially, no cutting or copying would be allowed in the corporate mode of operation by the corporate applications 132.

In other embodiments, cutting and copying may be allowed between corporate applications but may be restricted when trying to paste outside corporate mode. As will be appreciated, this could again be managed by group permission model using the operating system 140. When cutting or copying various text or images, or other data, a new data file is created which could have group permissions that would restrict where the pasting of that file is allowed to occur. Thus, when using a personal application, if trying to paste corporate data, an error might be returned, or the paste operation may simply not function.

In one embodiment, the corporate data 134 may be provided to a mobile device based on a secure connection with the corporate network. For example, this may be done through a virtual private network or other secure connection to an enterprise server.

Further, in one embodiment, the memory 110 may be located on a mobile device. In this case, the mobile device may have a pre-established secure connection with an enterprise server.

Figure 2:
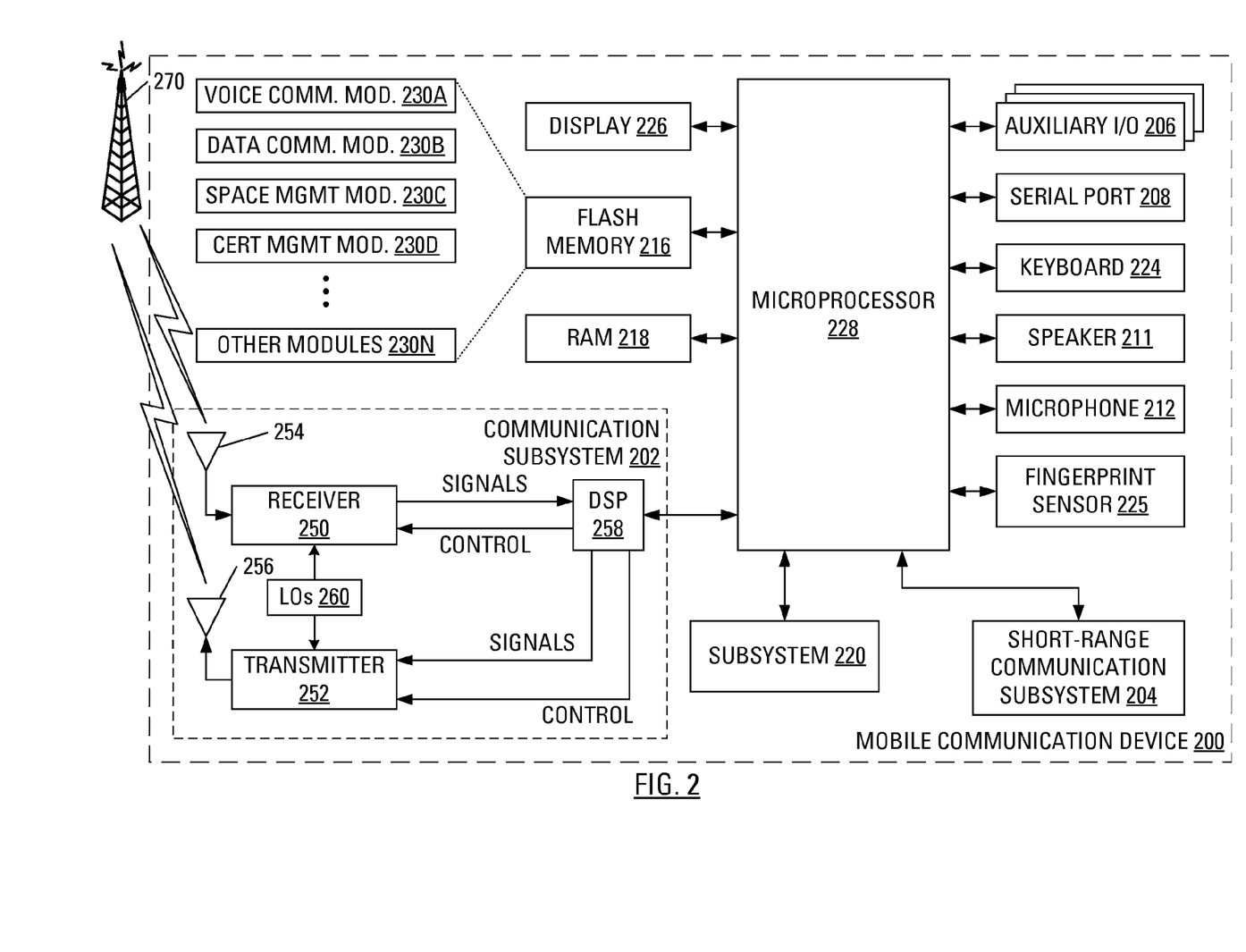
FIG. 2 illustrates a mobile communication device with memory that may be segregated as illustrated in FIG. 1.

FIG. 2 illustrates a mobile communication device 200 as an example of a device that may include the memory 110 of FIG. 1. The mobile communication device 200 includes a housing, an input device (e.g., a keyboard 224 having a plurality of keys) and an output device (e.g., a display 226), which may comprise a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 200, in part, responsive to actuation of the keys on the keyboard 224 by a user.

The housing may be elongated vertically, or may take on other sizes and shapes (including clamshell housing structures). In the case in which the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 200 are shown schematically in FIG. 2. These may include a communications subsystem 202, a short-range communications subsystem 204, the keyboard 224 and the display 226. The mobile communication device 200 may further include other input/output devices, such as a set of auxiliary I/O devices 206, a serial port 208, a speaker 211 and a microphone 212. The mobile communication device 200 may further include memory devices including a flash memory 216 and a Random Access Memory (RAM) 218 and various other device subsystems 220. The mobile communication device 200 may comprise a two-way radio frequency (RF) communication device having voice and data communication capabilities. In addition, the mobile communication device 200 may have the capability to communicate with other computer systems via the Internet.

The memory 110 of FIG. 1 may be implemented in a combination of the flash memory 216 and the RAM 218.

Operating system software executed by the microprocessor 228 may be saved in a computer readable medium, such as the flash memory 216, but may be saved in other types of memory devices, such as a read only memory (ROM) or similar storage element. In addition, system software, specific device applications, or parts thereof, may be temporarily loaded into a volatile store, such as the RAM 218. Communication signals received by the mobile device may also be saved to the RAM 218.

The microprocessor 228, in addition to its operating system functions, enables execution of software applications on the mobile communication device 200. A predetermined set of software applications that control basic device operations, such as a voice communications module 230A and a data communications module 230B, may be installed on the mobile communication device 200 during manufacture. A space management module 230C and a certificate manager module 230D may also be installed on the mobile communication device 200 during manufacture, to implement aspects of the present disclosure. As well, additional software modules, illustrated as an other software module 230N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items saved or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 200 is intended to operate. For example, the communication subsystem 202 of the mobile communication device 200 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the mobile communication device 200.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 200 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 200. In addition, the display 226 may also be utilized in voice communication mode, for example, to display the identity of a calling party, the duration of a voice call, or other voice call related information.

The short-range communications subsystem 204 enables communication between the mobile communication device 200 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication module, etc.

Figure 3:
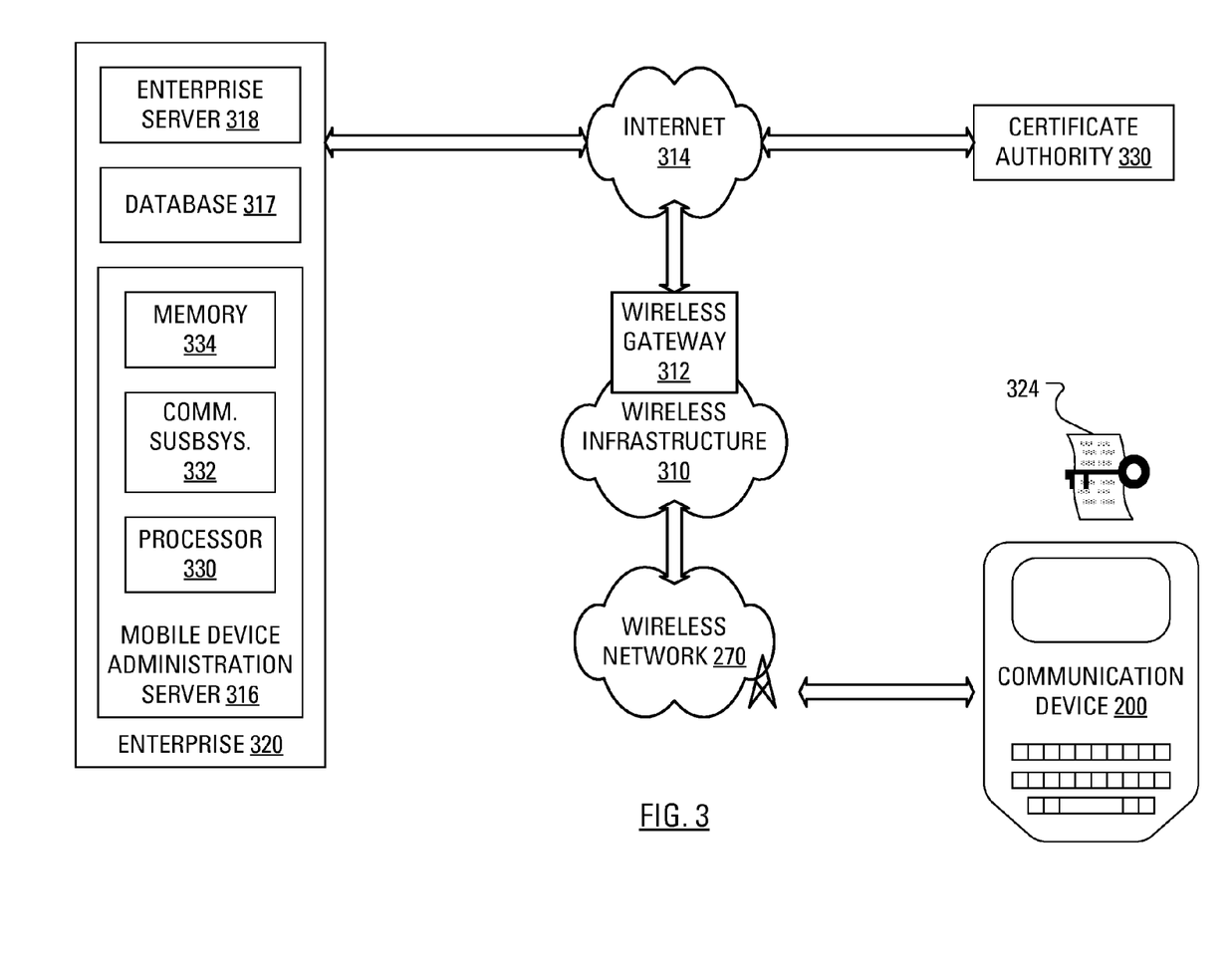
FIG. 3 illustrates an example system, including the mobile communication device of FIG. 2, a certification authority and a mobile device administration server.

Referring to FIG. 3, an overview of an example system for use with the embodiments described below is shown. One skilled in the art will appreciate that there may be many different topologies, but the system shown in FIG. 3 helps demonstrate the operation of the systems and methods described in the present application. For example, there may be many user devices connected to the system that are not shown in the overview of FIG. 3.

In FIG. 3, the mobile communication device 200 may, for example, be connected to an Internet Service Provider on which a user of the system of FIG. 3, likely the user associated with the mobile communication device 200, has an account.

The mobile communication device 200 may be capable of sending and receiving messages and other data via wireless transmission and reception, as is typically done using electromagnetic waves in the radio frequency (RF) spectrum. The exchange of messages and other data may occur, for instance, between the mobile communication device 200 and a base station in the wireless network 270. The mobile communication device 200 may receive data by other means, for example through a direct connection to a port provided on the mobile communication device 200. An example of such a direct connection is a Universal Serial Bus (USB) link.

As illustrated in FIG. 3, the wireless network 270 connects to a wide area network 314, represented as the Internet, via a wireless infrastructure 310. The wireless infrastructure 310 incorporates a wireless gateway 312 for connecting to the Internet 314.

A connection between the mobile communication device 200 and the Internet 314 allows the mobile communication device 200 to access a mobile device administration server 316 that is also connected to the Internet 314. Also connected to the Internet 314 may be an enterprise server 318. The mobile device administration server 316 and the enterprise server 318 may be grouped together in an enterprise 320 and share access to a database 317. Also connected to the Internet 314 may be a Certificate Authority (CA) 330. The mobile communication device 200 may maintain a key pair 324 that includes a private cryptographic key and a corresponding public cryptographic key.

The mobile device administration server 316 may include components analogous to the components of the mobile communication device 200, such as a processor 330, a communication subsystem 332 and a memory 334.

The mobile communication device 200 may generate the cryptographic keys 324 for use in a public key infrastructure (PKI) scheme. In a PKI scheme, a device generates a public cryptographic key (public key) and a corresponding private cryptographic key (private key). However, such cryptographic keys are of little use unless the public key is reliably associated with the identity of the mobile communication device 200, or the identity of the user of the mobile communication device 200.

A public key certificate (or digital identity certificate) is an electronic document, issued by a trusted party. The public key certificate incorporates a digital signature to bind together a public key with an identity—information such as the name of a person or an organization, an associated address and so forth. The certificate can be used to verify that a public key belongs to an individual.

The CA 330 may act as the trusted party, the entity that issues digital certificates. The digital certificate certifies the ownership of a public key by the named subject of the digital certificate.

Upon receiving a communication and an associated signature, the microprocessor 228 of the mobile communication device 200 may act to authenticate the communication. The microprocessor 228 may generate a hash of the communication. The microprocessor 228 may also decrypt the signature using a public key associated with the source of the communication. Upon matching the decrypted signature to the generated hash of the communication, the microprocessor 228 may consider the communication to have reliably originated at the source.

When the microprocessor 228 requires the public key associated with the source of the communication, the microprocessor 228 may review a local key store. Upon failing to locate the public key in the local key store, the microprocessor 228 may seek to import a digital certificate associated with the source of the communication. The microprocessor 228 may obtain the digital certificate directly from the source of the communication or from a trusted CA. Upon obtaining the digital certificate, the microprocessor 228 may save the digital certificate at the mobile communication device 200 in a certificate store. Furthermore, the microprocessor 228 may extract the public key from the digital certificate and save the public key in a key store.

When creating the corporate space 130, the space management module 230C may initialize one or more corporate certificate stores, that is, ranges of memory in which to save corporate certificates.

Upon creation of the corporate space 130, configuration of the mobile communication device 200 may involve importing corporate certificates into the corporate certificate stores. Ideally, the mobile device administration server 316 pushes corporate certificates to the mobile communication device 200. However, it is anticipated that the mobile device administration server 316 may not be present in the enterprise 320 in all arrangements. For example, rather than using the enterprise server 318 to relay messages to the mobile communication device 200, as well as allowing for updating and synchronization of calendar data and contact data, the ActiveSync push messaging component of Microsoft™ Exchange Server called Exchange ActiveSync may be used.

The task of importing corporate certificates into the corporate certificate stores is different dependent upon the presence or absence of the mobile device administration server 316. Additionally, if the mobile device administration server 316 is present, there may be incentive to enforce additional restrictions for which corporate certificates are imported.

Management (viewing/importing/deleting) of other personal certificates and corporate certificates may be accomplished through a combination of a user interface and a push from the mobile device administration server 316, with the management of the corporate certificates, in particular, being dependent upon the presence or absence of the mobile device administration server 316 and the status (enabled/disabled) of an IT policy.

Figure 4:
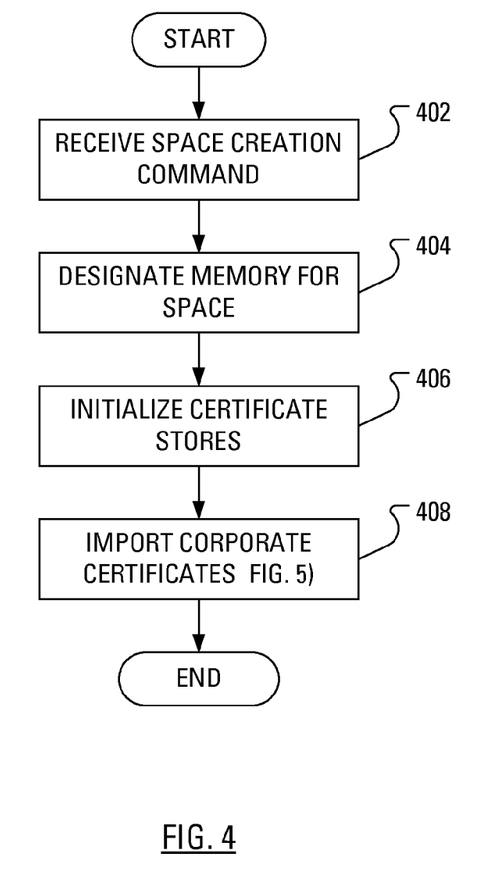
FIG. 4 illustrates example steps in a method of creating a segregated space in a memory as illustrated in FIG. 1.

FIG. 4 illustrates example steps in a method of creating a corporate space. Initially, the space management module 230C may receive (step 402) a command to create a corporate space. Responsively, the space management module 230C may designate (step 404) a range of addresses in the memory 110 for the corporate space 130. The space management module 230C may also send inter-process messages to the certificate manager module 230D to indicate that the corporate certificate stores are to be initialized for the corporate space 130. The certificate manager module 230D may then initialize (step 406) one or more corporate certificate stores, that is, ranges of memory in which to save certificates. Upon initializing (step 406) the one or more corporate certificate stores, the certificate manager module 230D may also import (step 408) corporate certificates into the corporate certificate stores.

Figure 5:
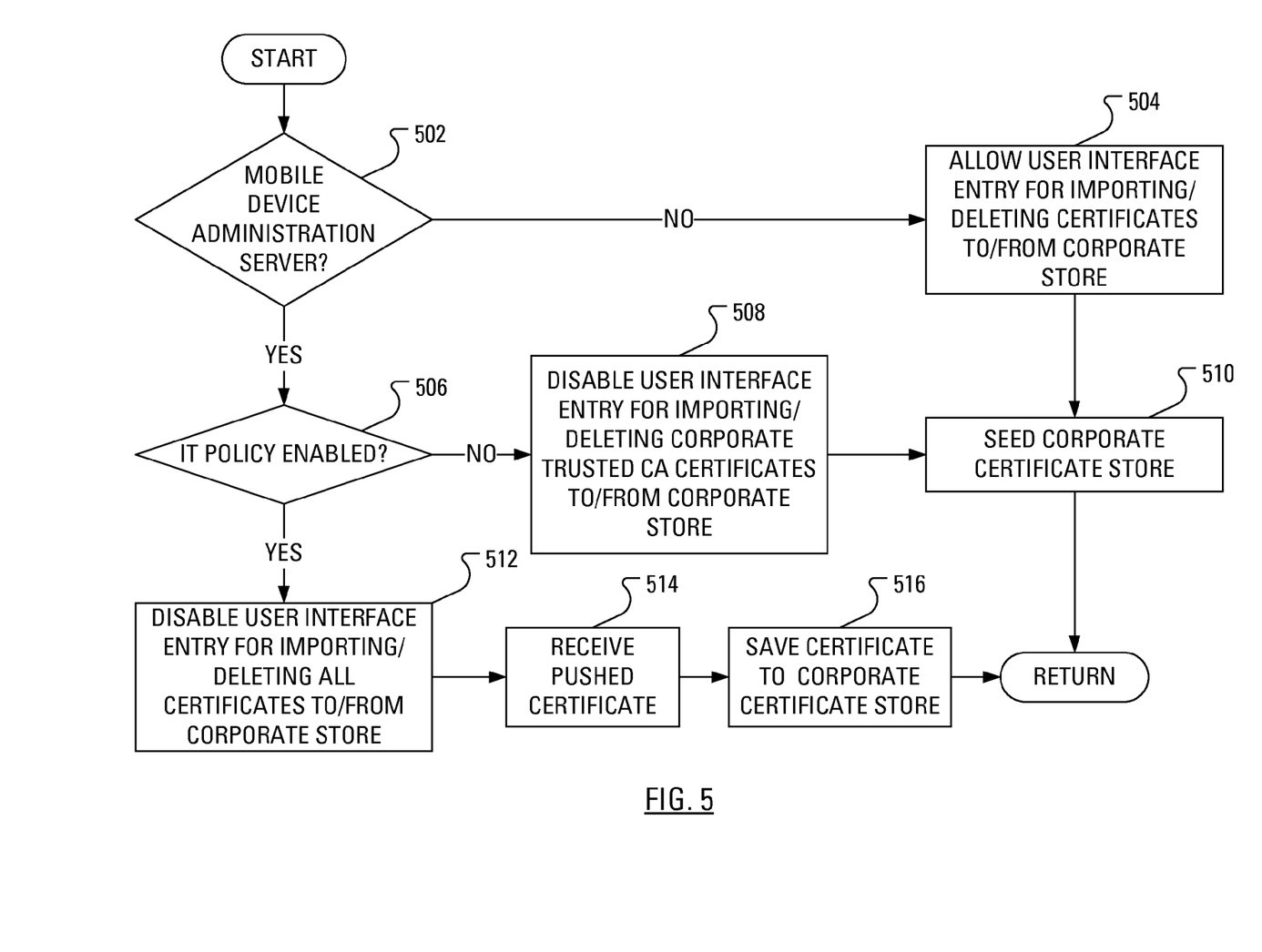
FIG. 5 illustrates example steps in a method of importing certificates into a certificate store in a memory as illustrated in FIG. 1.

More detail on the importation step (step 408) is presented in FIG. 5. In the importation method, example steps for which are presented in FIG. 5, the certificate manager module 230D may initially determine (502) whether the mobile device administration server 316 is present in the enterprise 320. The determination of presence or absence of the mobile device administration server 316 may be based upon an attribute of the corporate space 130. If the command to create a corporate space is received (step 402 of FIG. 4) by the space management module 230C from the mobile device administration server 316, the value of an administration server presence attribute may be set to a value of "1". Otherwise, the administration server presence attribute may be set to a value of "0". Accordingly, the certificate manager module 230D may determine (502) whether the mobile device administration server 316 is present in the enterprise 320 by determining the value of the administration server presence attribute for the corporate space 130.

Upon determining (502) that the mobile device administration server 316 is absent, the certificate manager module 230D may allow (step 504) the importing of corporate certificates into the corporate certificate stores through the operation of a user interface on the mobile communication device 200 and manipulation of the user interface by a user. Both corporate certificates and personal certificates may be allowed to be imported into the corporate certificate stores. The certificate manager module 230D may also allow (step 504) the deletion of certificates (corporate and personal) from the corporate certificate stores through the operation of the user interface.

Before being imported, the certificates to be imported are received by the mobile communication device 200. Certificates to be imported may, in one example, be received via the wireless network 270. In another example, certificates to be imported are received via a wired connection to a personal computer. In such an example, the mobile communication device 200 may connect to the personal computer via a Universal Serial Bus (USB) cable. In a further example, one of the other device subsystems 220 of the mobile communication device 200 may relate to an interface with memory media, such as a secure digital (SD) memory card. The mobile communication device 200 may receive the certificates to be imported by reading the SD memory card.

The certificate manager module 230D may then seed (step 510) the corporate certificate stores. As will be understood by those of ordinary skill in the art, seeding (step 510) a corporate certificate store may involve automatically importing, into the corporate certificate store, a set of those certificates that have been pre-approved for use, by the mobile communication device 200, in making trust decisions. By seeding the corporate certificate stores with such certificates, the burden of importing these certificates, using a user interface, is removed from the user.

Upon determining (502) that the mobile device administration server 316 is present, the certificate manager module 230D may determine (step 506) whether an IT policy has been enabled. An IT policy is generally a data file maintained at the mobile communication device 200. Accordingly, determining (step 506) whether an IT policy has been enabled may be as simple as reading, from the IT policy data file, a designation. The designation may indicate that the IT policy is enabled or disabled.

Upon determining (step 506) that an IT policy has not been enabled, the certificate manager module 230D may disable (step 508) the importing of corporate trusted CA certificates into the corporate certificate stores through the operation of a user interface on the mobile communication device 200. Certificates other than trusted CA certificates may be allowed to be imported. The certificate manager module 230D may also disable (step 508) the deletion of corporate trusted CA certificates from the corporate certificate stores through the operation of the user interface. The certificate manager module 230D may then seed (step 510) the corporate certificate stores.

In general, the "corporate trusted CA certificates" may be seen as but one example of "a subset of certificate types" for which importing and deleting may be disabled. Some examples of "certificate type" are trusted CA certificate, server certificate and client certificate.

In the presence of the mobile device administration server 316 and a disabled IT policy, the task of importing corporate certificates into the corporate certificate stores may be accomplished by the device administration server 316 pushing corporate certificates to the mobile communication device 200 for maintenance in the corporate certificate stores.

Upon determining (step 506) that an IT policy has been enabled, the certificate manager module 230D may disable (step 512) the importing of all certificates into the corporate certificate stores through the operation of a user interface on the mobile communication device 200.

In the presence of the device administration server 316 and an enabled IT policy, the task of importing corporate certificates into the corporate certificate stores is replaced by the device administration server 316 pushing corporate certificates to the mobile communication device 200 for maintenance in the corporate certificate stores. Accordingly, when an IT policy has been enabled, there is no need to seed the certificate stores. The mobile communication device 200 receives (step 514) a pushed certificate and saves (step 516) the pushed certificate to one or more of the corporate certificate stores.

In the presence of the mobile device administration server 316 and an enabled IT policy, the task of importing corporate certificates into the corporate certificate stores may be accomplished by allowing the user to add those certificates associated with private keys. A file that includes a certificate and a private key may have a format defined in a standard known as PKCS #12. PKCS #12 is one of the family of Public-Key Cryptography Standards (PKCS), published by RSA Laboratories.

As described hereinbefore, management of corporate certificates is dependent upon presence of the mobile device administration server 316 and status (enabled/disabled) of an IT policy. In contrast, management of personal certificates remains constant without regard to presence of the mobile device administration server 316 and status (enabled/disabled) of an IT policy.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of regulating population of a certificate store in a memory of a device, the method comprising:
   determining that a device administration server is present;
   determining that an information technology policy is enabled; and
   responsive to the determining that the device administration server is present and that an information technology policy is enabled, disabling user interface interaction, on the device, for importing certificates into a certificate store associated with a portion of memory of the device.

2. The method of claim 1 further comprising:
   receiving a certificate pushed to the device; and
   saving the certificate to the certificate store associated with the portion of memory of the device.

3. The method of claim 1 further comprising, responsive to the determining that a device administration server is present and that an information technology policy is enabled, disabling user interface-based selection for deleting certificates from the certificate store associated with the portion of memory of the device.

4. The method of claim 1 further comprising, before the determining:
   receiving a command to create the certificate store associated with the portion of memory of the device; and
   initializing the certificate store in the memory of the device.

5. The method of claim 1 further comprising allowing addition of a certificate associated with a private key.

6. The method of claim 5 wherein the certificate is associated with the private key in a file.

7. The method of claim 6 wherein the file has a format defined in a Public-Key Cryptography Standard.

8. A communication device comprising:
   a memory;
   a processor adapted to:
   determine that a device administration server is present;
   determine that an information technology policy is enabled; and
   disable, responsive to the determining that the device administration server is present and that an information technology policy is enabled, user interface interaction, on the device, for importing certificates into a certificate store associated with a portion of memory of the device.

9. The communication device of claim 8 wherein the processor is further adapted to:
   receive a certificate pushed to the device; and
   save the certificate to the certificate store associated with the portion of memory of the device.

10. The communication device of claim 8 wherein the processor is further adapted to disable user interface-based selection for deleting certificates from the certificate store associated with the portion of memory of the device.

11. The communication device of claim 8 wherein the processor is further adapted to:
    receive a command to create the certificate store associated with the portion of memory of the device; and
    initialize the certificate store in the memory of the device.

12. The communication device of claim 8 wherein the processor is further adapted to allow addition of a certificate associated with a private key.

13. The communication device of claim 12 wherein the certificate is associated with the private key in a file.

14. The communication device of claim 13 wherein the file has a format defined in a Public-Key Cryptography Standard.

15. A non-transitory computer-readable information recording medium containing computer-executable instructions that, when performed by a processor in a communication device, cause said processor to:
    determine that a device administration server is present;
    determine that an information technology policy is enabled; and
    disable, responsive to the determining that the device administration server is present and that an information technology policy is enabled, user interface interaction, on the device, for importing certificates into a certificate store associated with a portion of memory of the device.

16. The computer-readable information recording medium of claim 15 wherein the instructions further cause the processor to:
    receive a certificate pushed to the device; and
    save the certificate to the certificate store.

17. The computer-readable information recording medium of claim 15 wherein the instructions further cause the processor to disable user interface-based selection for deleting certificates from the certificate store associated with the portion of memory of the device.

18. The computer-readable information recording medium of claim 15 wherein the instructions further cause the processor to:
   receive a command to create the certificate store associated with the portion of memory of the device; and
   initialize the certificate store in the memory of the device.

19. The computer-readable information recording medium of claim 15 further comprising allowing addition of a certificate associated with a private key.

20. The computer-readable information recording medium of claim 19 wherein the certificate is associated with the private key in a file.

* * * * *